United States Patent
Smith et al.

(12) 
(10) Patent No.: US 6,605,236 B1
(45) Date of Patent: Aug. 12, 2003

(54) CONDUCTIVE POLYMERIC COMPOSITES, ARTICLES AND PROCESSES FOR THE PREPARATION THEREOF

(75) Inventors: Thomas W. Smith, Penfield, NY (US); David J. Luca, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/176,187

(22) Filed: Jan. 3, 1994

(51) Int. Cl.[7] .................. C08L 101/02; C08L 101/12
(52) U.S. Cl. .................. 252/500; 525/88; 525/92 R; 525/92 A; 525/92 G; 525/92 H; 525/92 L; 525/90; 525/91; 525/93; 525/98
(58) Field of Search .................. 525/69, 91, 93, 525/94, 88, 92 R, 92 A, 92 G, 92 H, 92 L, 90, 98; 252/500

(56) References Cited

U.S. PATENT DOCUMENTS

| | | | |
|---|---|---|---|
| 4,520,086 A | 5/1985 | Skotheim | 429/192 |
| 4,585,581 A | 4/1986 | Skotheim | 252/518 |
| 4,665,129 A * | 5/1987 | Naarmann et al. | 252/500 |
| 4,711,742 A | 12/1987 | Jen et al. | 252/500 |
| 4,839,322 A | 6/1989 | Yodice | 502/159 |
| 4,900,782 A | 2/1990 | Han et al. | 525/401 |
| 4,959,162 A * | 9/1990 | Armes et al. | 252/519 |
| 4,959,180 A * | 9/1990 | Armes et al. | 252/519 |
| 5,021,193 A * | 6/1991 | Armes et al. | 252/519 |
| 5,247,001 A | 9/1993 | Lacour | 524/398 |
| 5,314,778 A * | 5/1994 | Smith et al. | 430/111 |

FOREIGN PATENT DOCUMENTS

| | | | | |
|---|---|---|---|---|
| GB | 2124635 | * | 8/1983 | 252/500 |
| WO | 9002763 | * | 3/1990 | 252/500 |

OTHER PUBLICATIONS

Zinger CA 116:174876.*
Zinger CA 115:83004.*
Zinger CA 112:225435.*
Bates et al., "Flexible & Heat–Processable Conductive Films of Polypyrrole" (1985) J. Chem. Soc., Chem. Commun., pp. 871–872.*

* cited by examiner

*Primary Examiner*—Jeffrey Mullis
(74) *Attorney, Agent, or Firm*—Robert F Thompson

(57) ABSTRACT

A composition comprised of a composite comprised of an aromatic or heteroaromatic polymer comprised of monomer or monomers selected from the group consisting of pyrrole, indole, thiophene, thianaphthene, indene, azulene and ring pendant substituent derivatives thereof as a discrete phase; and a block copolymer as a continuous phase selected from the group consisting of ionophoric and ionomeric copolymers, wherein the block copolymer has at least one apolar segment and at least one ion binding segment, wherein the ionomeric or ionophoric block copolymer is present in an amount from about 99 to about 50 percent by weight based on the combined weight of the block copolymer and the aromatic or heteroaromatic polymer, wherein the block copolymer provides micellar or vesicular domains for organization and polymerization of the monomer or monomers.

18 Claims, 1 Drawing Sheet

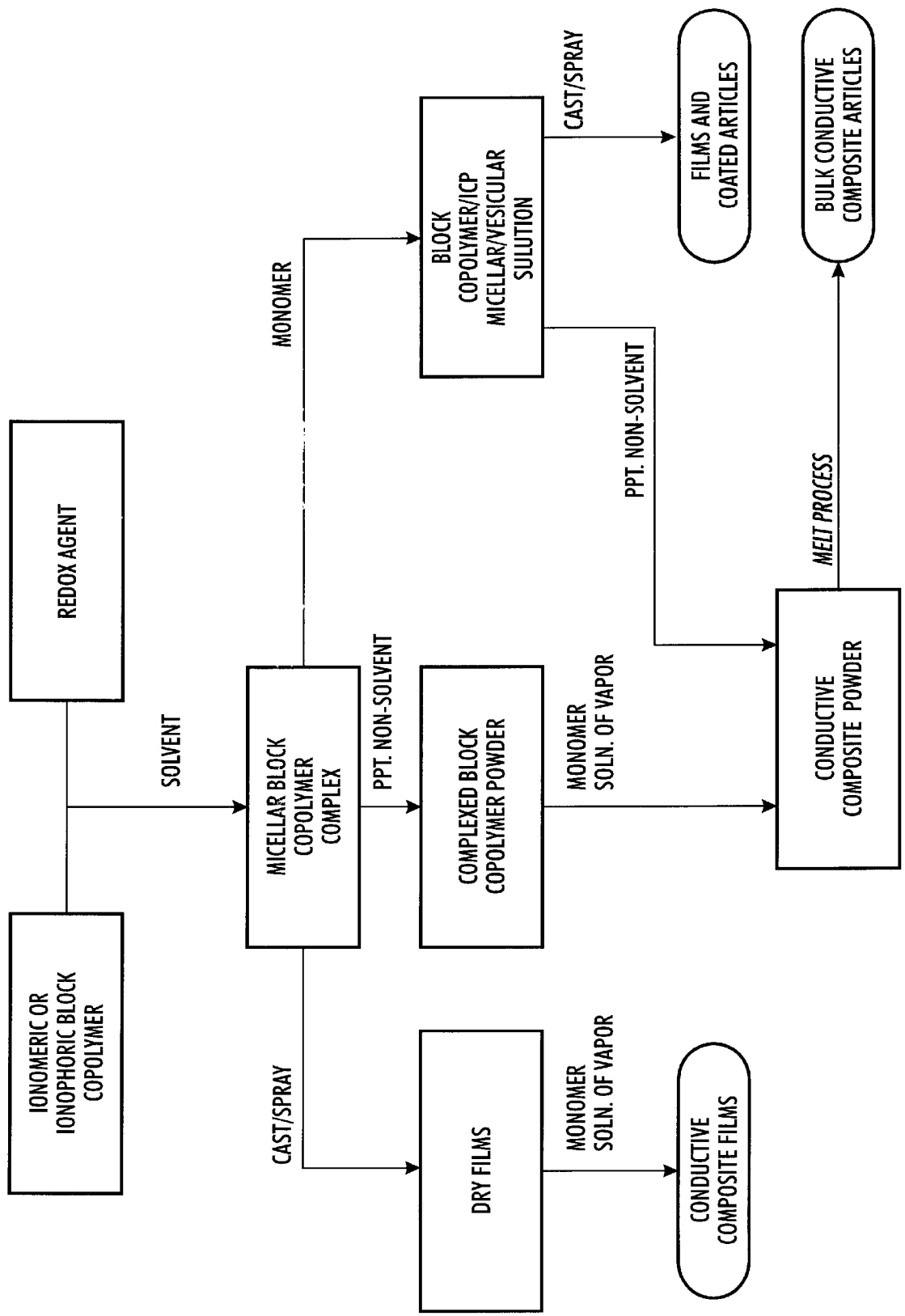

CONDUCTIVE POLYMERIC COMPOSITES, ARTICLES AND PROCESSES FOR THE PREPARATION THEREOF

CROSS REFERENCE TO COPENDING APPLICATIONS AND PATENTS

Attention is directed to application U.S. Ser. No. 896035 (D/91425) now U.S. Pat. No. 5,314,778 filed Jun. 9, 1992 entitled "CHARGE PINNING IN NEGATIVE CHARGING TONERS WITH IONOPHORIC AND IONOMERIC BLOCK COPOLYMERS", the disclosure of which is incorporated by reference herein in its entirety.

Attention is directed to issued U.S. Pat. Nos. 4,592,989 (D/83061) entitled "ION-BINDING POLYMERS FOR CONTROL OF CHARGING CHARACTERISTICS" and 5,102,763 (D/89066) entitled "COLOR TONER COMPOSITIONS ENABLED BY COLORED SILICAS WITH ADSORBED IONOPHORIC DIBLOCK COPOLYMERS", the disclosures of which are incorporated by reference herein in their entirety.

BACKGROUND OF THE INVENTION

This invention is generally directed to melt processable, intrinsically conductive and semiconductive polymeric composites useful in preparing electrically conductive films, coatings and articles with controlled conductivity. The conducting polymer composites of this invention can be manipulated in preparative processes to result in materials that are functional in many known applications for intrinsically conducting organic polymers, for example, molecular circuitry, electronic membranes, photovoltaics, light emitting diodes, electrochromic windows, rechargeable batteries, electrolytic capacitors, optical switches, and electromagnetic interference shielding. More specifically, the present invention is directed to conductive polymeric compositions containing therein, known conductive aromatic and heteroaromatic polymers, for example, poly(pyrrole), poly(thiophene) or poly(azulene) and their congeners in intimate admixture with an ionophoric or ionomeric block copolymer, that is, a block copolymer with an ion binding or ion coordinating segment and a nonfunctional segment to control morphology of the structured dispersed phase, and insure solubility and melt processability of the resulting polymeric composite conducting films and and functional articles. The ionophoric or ionomeric character of the block copolymer enables complexation or sequesteration of redox active dipolar molecules or ions in the binding segment of the block copolymer. The redox active ion or dipolar molecule, in embodiments of the present invention, acts as an oxidative coupling agent or redox reagent for the polymerization of heteroaromatic or aromatic monomers, yielding, Intrinsically Conductive organic Polymers (ICPs) which may be physically trapped or matrix polymerized to the ionophoric or ionomeric segment of the block copolymer.

The present invention thus provides soluble, melt processable, electronically conducting or semiconducting thermoplastic composites of intrinsically conducting organic polymers that are matrix polymerized to, or within, the ion-binding segments of ionophoric or ionomeric block copolymers. The present invention further specifies processes for the preparation of these composites and provides processes for making electrically conductive articles therefrom. The ICP composites may be prepared as colloidal solutions or in the solid state, with the material prepared in the solid state generally having higher conductivity.

The composite compositions of this invention are prepared in embodiments by template polymerization of aromatic and heteroaromatic monomers such as thiophene, pyrrole, indole, indene and azulene or a congener, for example, 3-methyl pyrrole, bithiophene, 3-alkylthiophenes, thianapththene, and the like, in the presence of an ionophoric or ionomeric block copolymer to which a suitable redox reagent for the oxidative coupling of the aromatic or heteraromatic monomer reactants, has been specifically bound.

Intrinsically conducting organic polymers, composites thereof, articles thereof, and processes for their preparation, are well known and are extensively documented in numerous prior art patents and publications, the disclosures of which are incorporated by reference herein in their entirety. Thus, for example, Rabek et al., *Synthetic Metals*, 45 (1991) 335–351, have described the polymerization of pyrrole in solid state $FeCl_3$ complexes with poly(ethylene oxide), poly(oxy-1,2-ethane diyl), poly(β-propiolactone), poly(2-oxetanone) or poly(1,5-di-oxepan-2-one). Jasne and Chicklis have described the electrochemical polymerization of pyrrole in latices with covalently bound anionic sites and Bates et al., *J. Chem. Soc., Chem. Commun.*, (1985) 871, have described the preparation of a heat processable composite of poly(pyrrole) in sulfonated styrene (hydrogenated) butadiene triblock copolymer. Armes and Vincent, *J. Chem. Soc., Chem. Commun.*, (1987) 288, described the preparation of colloidal poly(pyrrole) in water with agency of poly(vinyl pyrrolidone) or poly(vinyl alcohol-co-acetate). Poly(ethylene oxide), poly(acrylic acid) and block copolymers of poly(ethylene oxide) were specifically reported to be ineffective in stabilizing colloidal dispersions of poly(pyrrole). Similarly, Bjorklund Leidberg *J. Chem. Soc., Chem. Commun.*, (1986) 1293, described the preparation of colloidal poly(pyrrole) in water with agency of methylcellulose. The seminal synthesis of poly(pyrrole) involved the electrochemical, oxidative coupling of pyrrole at electrode surfaces to directly yield conducting polymer films as reported by A. F. Diaz, K. K. Kanazawa and G. P. Gardini, *J. Chem. Soc. Chem Comm.*, 635 (1979).

The chemical oxidative coupling polymerization of thiophene to yield conducting polymers is more difficult to effect, and accordingly poly(thiophene) is most often generated electrochemically. Garnier and coworkers reported the electropolymerization of thiophene, *J. Electroanal. Chem.*, (1982) 135, 173, and the electropolymerization of thiophene in poly(methylmethacrylate) and poly(vinyl chloride), see *J. Chem. Soc., Chem. Commun.*, (1986) 783; and *J. Phys. Chem.*, 92 (1988), 833. The chemical synthesis of polythiophene with ferric perchlorate and ferric chloride/nitromethane was reported by M. Mermilliod-Thevenin and G. Bidan, *Mol. Cryst. Liq. Cryst.*, 118:227 (1985), and S. Hotta, et al., *Synthetic Metals*, 9 (1984) 381. Koβmehl (1986) *Makromol. Chem., Macromol. Symp*, 4:45 and (1982) *Mol. Cryst. Liq. Cryst.*, 83:291, reported the chemical synthesis of poly(thiophene) with nitrosonium salts and Yamamoto et al., reported Grignard coupling to yield linear poly(thiophene), see (1981) *Chem. Lett.*, 1079; and (1982) *J. Polym. Sci., Polym. Lett. Ed.*, 20:365. Similarly, Elsebaumer, et al., reported Grignard coupling to yield poly (3-alkyl thiophenes). Alkylthiophene derivatives can be obtained as soluble polymer solutions, particularly when prepared by coupling of organolithium or organocadmium derivatives, *Synthetic Metals*, 18 (1987) 277.

Environmental instability, lack of mechanical strength and integrity, and difficulties in processing have represented major barriers to commercial application of intrinsically conducting organic polymers. Among ICPs, poly(pyrroles)

and poly(thiophenes) are acknowledged to be among the most environmentally stable. Their synthesis is relatively simple. Recent work in leading enterprises seeking to exploit these polymers in the burgeoning commercial applications for intrinsically conducting polymers have focused on improved processing and the development of mechanical integrity in these materials. Poly(thiophenes), obtained by conventional processes are typically intractable, see for example, Advanced Materials, Volume 5, Number 9, September 1993, Part 2, page 646–650. Thus there remains a need for highly conducting, environmentally stable and easily processable polymer composite materials.

The preparative processes and procedures described in the literature fall into four main categories:

Category 1—The electrochemical polymerization of pyrrole or thiophene to directly yield the ICP in film form.

Category 2—The generation of colloidal ICP particles stabilized by selected water soluble polymers.

Category 3—The insitu generation of ICP within the interstices of a preformed polymer host into which a reagent for the oxidative polymerization has been imbibed. Subsequent exposure to the monomer yields a composite of the host polymer and the ICP. Alternatively, monomer (pyrrole or thiophene) may be imbibed into a preformed polymer film on an electrode surface and electrochemically polymerized within the interstices of a preformed polymer host.

Category 4—solublization of the ICP by polymerization of monomers with sufficiently long alkyl substituents. This approach has been particularly popular with poly (thiophene) where soluble polymers can be obtained from 3-alkylthiophene derivatives wherein the alkyl chain is $C_4$ or longer. The processes of Categories 1 and 3 are generally limited to film geometries, and melt processing of the composition is not generally possible. The prior art processes for preparing ICPs, particularly those of Category 3, do not provide systems which possess the phase structured solutions, films and articles of the composite compositions of the present invention and therefore do not provide the manipulative and processing advantages associated therewith Colloidal ICP particles such as those generated by Category 2 processes are refractory powders and are not in themselves film forming. Accordingly, these materials must be physically dispersed in polymer hosts and thus offer no advantage over the widely used colloidal graphite composite compositions. With electrochemically polymerized films of pure ICP's (Category 1) it is possible to vary the conductivity of the film by control of the oxidation state of the ICP. In ICP's generated by the processes of category 3, it is not generally possible to vary the conductivity of the film by control of the oxidation state of the ICP rather conductivity is determined by approach to the percolation threshold in the composite.

Accordingly, there continues to be a need for improved electrically conducting or semiconducting polymeric materials, composites, films, and articles, and improved processes for preparing electrically conducting polymeric materials and articles thereof. Additionally, there continues to be a need for materials of precisely controlled conductivity or resistivity. Also, there continues to be a need for enhancements in thermal oxidative and hydrolytic stability of ICP's. Additionally, there is a need for electrically conducting polymeric materials and composites which can be prepared by a simple, direct, and economical processes.

Moreover, there is a need for ICP composites which can be extruded or injection molded. There is also a need for film forming ICP composites which may be conveniently solution cast from common hydrocarbon solvents.

The present invention in embodiments overcomes the performance and processability problems associated with the ICP compositions of the prior art by forming soluble colloidal composites comprised of a conducting aromatic or heteroaromatic polymer and an ionophoric or ionomeric block copolymer complex. The conductivity of the composite can be controlled by variation of the oxidation state of the ICP and/or by modulation of the structural morphology of the conductive polymeric composite particles. An important feature of the present invention is the specification of the precise set of polymeric composite compositions which are film forming, melt processable, and exhibit specific stable and controllable levels of conductivity.

SUMMARY OF THE INVENTION

It is an object of the present invention to provide polymeric composite compositions or intrinsically conducting organic polymer (ICP) compositions with controlled electrical conductivity.

It is a further object of the present invention to provide ICP composite compositions which are readily prepared and processed into films and useful articles.

It is another object of the present invention to provide ICP composite compositions which are processable by solvent-liquid means, that is by dissolving or forming micellar solutions, dispersions or suspensions in simple apolar or polar organic solvents.

It is another object of the present invention to provide ICP composite compositions which are environmentally stable.

It is another object of the present invention to provide ICP composite compositions which are processable by melt means such as extrusion, melt mixing, or molding.

It is an additional object of the present invention to provide ICP composite compositions possessing expanded or adjustable conductivity properties.

It is another object of the present invention to provide ICP composite compositions which exhibit the requisite mechanical properties for device and engineering plastics applications.

Additional objects and advantages of the invention will be apparent to those skilled in the art from the descriptions of compositions and processes for the preparation thereof which follows.

These and other objects of the present invention are accomplished in embodiments by providing a composite composition comprising: an aromatic or heteroaromatic polymer with regular or recurring units of pyrrole, indole, thiophene, thianaphthene, indene, azulene, and ring pendant substitutent derivatives thereof, such as alkyl, aryl, alkoxy, carboxyl, and cyano, nitro, or halogen substituents; and an ionophoric or ionomeric block or graft copolymer. These conductive and semiconductive composites may be formed in the solid state or in solution. The composites formed in structured solution are micellar or vesicular and resistive films may be cast from these colloidal solutions. Composites formed in the solid state are melt processable, are electrically conductive or semiconductive and are soluble in the sense that they may be dispersed in apolar solvents. The number of monomers in the aromatic or heteroaromatic conductive polymer is from about 10 to about $10^{10}$. The degree of polymerization in the aromatic or heteroaromatic conductive polymer varies from about 10 to about $10^{10}$ depending on the extent of cross linking or branching leading to highly networked polymers which may occur during oxidative coupling. Preferred aromatic or heteroaromatic pendant ring substituents include alkyl, aryl and alkoxy substituents because of their ready availability, solubility, stability, and ease of preparation. These substituents may, for example, contain from 1 to about 20 carbon atoms. The resulting compositions are typically soluble, melt processable, with electrical conductivity being highly controlled by the amount of heterocyclic polymer generated and the relative proportions of the apolar and ionophoric or ionomeric segments of the block or graft copolymer. Also contemplated in the present invention are processes for the preparation of the electrically conductive composite compositions and processes for preparing useful electrically conductive articles therefrom.

In embodiments of the present invention intrinsically conductive or semiconductive polymer (ICP) composites, and particularly, poly(thiophene) and poly(pyrrole), can be readily prepared with the agency of ion active block copolymers. By the term ion binding block copolymers is meant ionophoric and ionomeric block copolymers wherein there is at least one block segment of the copolymer that is capable of binding ionic species by either ionic or coordination bonding interactions and there is at least one block or segment of the copolymer that is incapable of or has a negligible affinity for ionic species. These ICP composites may be prepared as colloidal or structured solutions or in the solid state. It is generally the case that structured solution or solid state equilibrium morphologies in these block copolymer systems are more easily achieved prior to generation of the ICP in the ionophoric or ionomeric phase. The ICP composites prepared in the solid state generally possess greater conductivity than the ICP composites prepared in the structured or colloidal solutions. The relative conductivity of the compositions depends upon: 1.) the composition of the block copolymers, for example, higher conductivity being achieved in block copolymers with high volume factions, for example, greater than 30% by weight, of the ionophoric or ionomeric segment; 2.) the amount of ICP generated in the domain of the ionophoric or ionomeric segment; and 3.) the ability of the composite composition to reach an equilibrium morphology as a structured solution, or in the solid state.

The colloidal or structured solutions are appropriate for solution spraying, casting, or coating of articles or materials to yield structures coated with tough integral films of an intrinsically conductive or semiconductive composite. Alternatively, the colloidal solutions can be precipitated to yield thermoplastic powders which may be melt processed to yield conductive or semiconductive plastic articles or coatings.

The ICP composites, prepared directly in the solid state, are advantageous when highly conductive composites are required. In these systems, cylindrical, lamellar or bicontinuous morphologies, which may be achieved in embodiments, depending on the relative volume fractions of the ionomeric or ionophoric phase, are retained upon matrix polymerization of, for example, poly(thiophene) in the ion-binding phase. In these systems, the conductivity is controlled by the morphology and structure created by the block or graft copolymer and by the amount and oxidation state of the ICP generated within the ion binding phase. The nature of the oxidant (anion and cation) bound to the ion-binding segment of the block copolymer can also have a profound effect on the rate of polymerization, as well as the composite composition morphology and conductivity.

Ionophoric block copolymers which are suitable agents for the preparation of conductive or semiconductive composites of ICPs are typified by: poly(styrene-b-ethylene oxide), poly(butadiene-b-ethylene oxide), poly(styrene-b-ethyloxazoline), poly(styrene)-b-poly(oxime), poly(styrene)-b-poly(methylmethacrylate), and the like. With ionophoric block copolymers, the polymerization of the aromatic or heteraromatic monomer is accomplished by an oxidant or redox reagent which forms a specific complex with the ionophoric segment of the block copolymer. Salts of $Fe^{3+}$, $Cu^{2+}$, $Sn^{4+}$, and $Ce^{4+}$ ions, are particularly suitable oxidants as are peroxydisulfate, ferricyanide, $I_2/I_3^-$, and peroxide salts of alkali and alkaline earth metals, such as sodium, potassium, magnesium, and calcium.

Ionomeric block copolymers which are suitable agents for the preparation of conductive or semiconductive composites of ICPs are, for example: poly(styrene-b-acrylic acid), poly(styrene-b-vinylsulfonic acid), and the like. Ionomeric block copolymers containing poly(carboxylic acid) segments are capable of coordinative or ion exchange binding of oxidative coupling reagents such as $Fe^{3+}$, $Cu^{2+}$, $Sn^{4+}$, and $Ce^{4+}$. Ionomeric block copolymers wherein the ionomeric segment is sulfonic acid or quaternary ammonium respectively, bind redox cations ($Fe^{3+}$, $Cu^{2+}$, $Sn^{4+}$, and $Ce^{4+}$) or anions, for example, peroxydisulfate or ferricyanide, preferably by ion exchange.

In both the ionophoric and ionomeric block copolymers, the apolar segment of the block copolymer provides solubility and processability and the ionomeric or ionophoric segment enables the formation of intrinsically conducting polymer within its interstices. The ionomeric or ionophoric phase may also provides a medium where a reservoir of counter ions essential to the facile redox cycling of intrinsically conductive polymers can be localized at distances from which they can rapidly diffuse into and out of the fractionally oxidized conducting polymer. This feature is particularly important to the enhanced performance characteristics for the compositions of this invention in electronic device applications.

The processes and compositions described herein and the products derived therefrom provide environmentally stable, intrinsically conducting polymer composites which can be processed in solution or in a "melt" for a wide range of applications. The present invention also provides a means of varying the conductivity of the composite over a wide range, for example, $10^{-12}$ to $10^2$ Siemens per cm. Deliberate variation of the relative volume fractions of the block copolymer segments by appropriate section of block copolymers and by controlling the amount of monomer and therefore the amount of heterocyclic homopolymer generated in the ionomeric or ionophoric phase provides a useful means for modulating the conductivity of the composition over the aforementioned conductivity range. Another useful means for controlling the apparent relative volume fraction of the ion binding B segment is to imbibe or add to the structured solution a homopolymer with a structure corresponding to the ion binding B segment in monomer composition of the block or graft copolymer in an amount from 25 to 150 percent by weight based on the weight of the ion binding B segment of the copolymer. Thus, for example in a structured solution formed from a PS-b-POE block copolymer, a POE homopolymer may be added before or after the addition of the redox salt.

Although not desired to be limited by theory, it is believed that the oxidative coupling of aromatic and heteroaromatic monomers leading to conductive homopolymers, such as poly(pyrrole) or poly(thiophene), is catalyzed by an oxidative coupling reagent bound to ionophoric or ionomeric segment in a diblock polymer to yield a heterocyclic our aromatic homopolymer phase which has been template polymerized within the ionophoric or ionomeric domain. In order to polymerize, the monomer must diffuse into the domains formed by the ionophoric or ionomeric segments where the redox reagent is bound. Once this is occurs, the aromatic or heteraromatic monomers are oxidized to generate radical cation species thereof which rapidly couple to yield linear or insoluble network polymers which are, at a minimum, physically entangled with the ionophoric or ionomeric segments. Even though the ICP product itself tends to be intractable, it is segregated within the ionophoric or ionomeric phase and therefore the solubility or dispersibility properties of the ICP composite is substantially improved. The thermoplastic nature of the apolar segment of the ion active diblock polymers imparts solubility and melt processability to the resulting composite compositions.

The level of conductivity is controlled primarily by the volume fraction of the ionophoric or ionomeric segment in the block copolymer. For block copolymers containing less than 25% by weight of the ionophoric or ionomeric component, the solid state morphology of the composite is typically that of an ordered close packed array of spherical domains (micelle cores) of the ionophoric or ionomeric polymer and the ICP. These systems will tend to be insulating with conductivities of about $10^{-10}$ Siemens per cm or less. For block copolymers containing greater than 25% and less than 35% by weight of the ionophoric or ionomeric component, the solid state morphology of the composite is likely to exhibit vesicular, cylindrical or worm like structures. For polymeric composite systems containing greater than 35% by weight of the ion binding component lamellar and bicontinuous morphologies can be achieved and the conductivity of these compositions approaches those conductivities exhibited by pure ICP's, of about $10^{-3}$ to $10^2$ Siemens per cm.

BRIEF DESCRIPTION OF THE DRAWING

The Figure is a flow chart which illustrates in embodiments various processes for the solution and solid state synthesis of ICP composites with ionophoric or ionomeric block copolymers of the present invention.

DETAILED DESCRIPTION

The ICP composite compositions prepared in the present invention are comprised of a fractionally oxidized aromatic or heteroaromatic polymer with regular or recurring units of pyrrole, indole, thiophene, thianaphthene, indene, azulene, ring pendant substitutent derivatives thereof, and the like; and an ionophoric or ionomeric block copolymer with ion binding or ion coordinating sites. Ionophoric or ionomeric block copolymers which may be employed in the present invention include A-B diblock copolymers, A-B-A triblock polymers, A-B-C triblock polymers and analogous graft copolymers in which the A, B and C segments may themselves be homo-polymeric, co-polymeric or multi-meric having soluble, apolar segments and segments bearing ionizable groups, such as carboxylic acids, —$CO_2H$, that are capable of forming coordination complexes with redox metal ions and may be ion exchanged to ionically bind metal cations, or groups capable of forming ionic associations, hydrogen bonds, or ion dipole bonds to redox active cations or dipolar molecules particularly quinones and $I_2$.

Ionizable polymers and copolymers with a high percentage of ionizable residues are often classified as poly (electrolytes). Copolymers containing a small percentage of ionizable residues, less than about 10% by weight, are often referred to as ionomers. Ionophors in contrast are neutral dipolar molecules or macromolecules which bind ions through ion dipole forces. Illustrative examples of ionomeric polymer segments with various types of ionizable groups include the following general classes: anionic ionomers, for example, sulfonic acid salts, carboxylic acid salts, and phosphonic acid salts; and cationic ionomers, for example, linear in-chain or cyclic (aliphatic or aromatic) ammonium or alkylammonium salts, pendant chain ammonium or alkylammonium salts, phosphonium salts, and sulfonium salts.

Grafted copolymers of the formula $A(B)_n$ are also useful in embodiments of the present invention as ionomeric or ionophoric polymers, wherein A and B are independently homopolymeric, copolymeric or multi-meric, and n is a number from 1 to about 10 representing the B polymeric segments or blocks grafted to the main chain polymer A.

It is understood that an ionomeric block copolymer may include more than one type of ionizable group, in which case, the different ionizable groups preferably all have the same polarity.

Preferably, the ionomeric polymers are in the form of a diblock copolymer (A-block-B or A-b-B) where one polymer segment (A) is miscible with the desired solvent and the other polymer segment (B) is ionomeric or ionophoric. The solvent miscible segment may be apolar when dissolution in simple hydrocarbon solvents is desired or may be water soluble if dispersion or dissolution in water is desired. The A segment is necessarily different in chemical structure and opposite in hydrophobicity from the ionomeric or ionophoric B segment of the block copolymer.

A preferred apolar segment in the ionophoric or ionomeric copolymer in embodiments is poly(styrene) and derivatives thereof. Another preferred apolar segment in the ionophoric or ionomeric copolymer in embodiments is poly(butadiene) and derivatives thereof. The composites resulting therefrom are soluble in solvents which dissolves poly(styrene) or poly(butadiene) homopolymers and derivatives thereof, for example, toluene, ethylacetate, methylene chloride, cellosolves, and others as disclosed in the Polymer Handbook.

The ion binding copolymers of the present invention are further characterized as having an apolar A segment or segments with a number average molecular weight of at least 10,000 to about 200,000 and an ion binding B segment or segments with a number average molecular weight of at least 400 to about 150,000. As the molecular weight of the ion binding copolymers selected is increased a corresponding increase in the melt and solution processability of the polymer composites is realized. The useful range of weight ratio A:B of apolar segment A to ion binding segment B in embodiments is from about 20:80 to about 98:2. It has been observed that when the weight ratio of the apolar A segment is less than about 20 percent, the solvent processability decreases significantly to such an extent that the composite compositions are no longer easily prepared and processed according to the objects of the present invention. Preferred ion binding copolymers of the present invention provide not only simple surface activity properties characteristic of block copolymers but also provide for ion binding and microscopic phase separation properties for selectively segregating the ion conducting polymer products. Therefore the aforementioned molecular weight and weight percent ratios are believed to important in preparing polymeric composite products with useful conductivity and resistivity properties.

The redox agent salt is generally bound to the ion-binding polymer in an amount of from about 0.5 percent to about 100 percent by weight depending on, for example, the ion binding capacity of the ion-binding block or graft copolymer, and the amount of ICP to be incorporated in the ionomeric or ionophoric phase. In complexes with, for example, ion-binding block copolymers containing oxyalkylene segments, stoichiometric, that is 100% of binding capacity, complexes generally occur at a minimum of 4 oxyalkylene residues per binding site. The mole ratio of the redox reagent to the aromatic or heteroaromatic monomer at which the yield of ICP polymer is maximized generally occurs in a single range from about 2.0:1.0 to about 5.0: 1.0.

ICPs PREPARED IN MICELLAR SOLUTION The conducting composites of the present invention may be prepared in either colloidal solution or in the solid state. In the former embodiment an appropriate ionic redox reagent is in embodiments stoichiometrically complexed to structured solutions, that is micellar or vesicular solutions, of the ionomeric or ionophoric block copolymer. An ordered or structured solution is defined to mean a microscopic two phase dispersion comprising micellar, vesicular, or microemulsified particles dispersed in a continuous solvent phase. The structured solutions with the complexed redox reagent are then reacted with the aforementioned reactive aromatic or heteroaromatic monomer precursors to yield submicron, colloidal, micellar or vesicular solutions containing the conducting aromatic or heteroaromatic polymeric materials contained in the discontinuous phase. The reactive aromatic or heteroaromatic monomers can in embodiments be introduced into the reactive sites of the structured solutions by simple addition and mild mixing.

Thus, the electrically conducting composite compositions of the present invention have a micellar or pseudo two phase morphology, consisting of a phase (A) of the apolar, organic solvent miscible, segments of the block copolymer and a phase (B) comprised of the ionomeric or ionophoric segments of the block copolymer in which the insoluble electrically conducting aromatic or heteroaromatic homopolymers tends to be localized.

Processes for preparation of soluble melt processable electrically conductive composite compositions of the present invention using a structured or ordered solution approach comprises, in embodiments, the steps of: a.) mixing an ordered or structured solution containing ionomeric or ionophoric block or graft copolymers and a redox reagent to form a complexed, structured, micellar or vesicular solution wherein the ion binding segment of the block or graft copolymer is bound or complexed to the redox reagent; b.) adding a polymerizable aromatic or heteroaromatic monomer selected from the group of pyrrole, indole, thiophene, thianaphthene, indene, azulene, and ring substitutent derivatives thereof, to the complexed structured solution; c.) optionally heating or cooling with agitation as appropriate to effect and control the polymerization of the the aromatic or heteroaromatic monomer to form a structured solution containing an electrically conductive composite comprised of the ionophoric or ionomeric polymer and partially oxidized aromatic or heteroaromatic polymer; d.) optionally precipitating the structured solution containing the electrically conductive composite into a non solvent for the A segment of the block or graft copolymer, and then ion exchanging and extracting the precipitate to isolate a composite product with specific newly exchanged counterions at radical cation sites of the conducting polymer; and e.) optionally casting films or articles directly from the initially formed structured solution of the electrically conductive composite. The polymerization of the aromatic or heteroaromatic monomers to form intrinsically conducting polymers may in embodiments be accomplished spontaneously at ambient temperature without the agency of heating by simply mixing the reactive monomer with the structured solution. However, depending upon a number of factors such as the concentration and reactivity of the monomer selected, the amount of the redox agent present, the stability of the structured solution, and the like, optional gentle heating, not to exceed about 90 to 100° C, of the structured solutions containing imbibed monomer to facilitate the polymerization reaction may be indicated in some instances.

ICPs PREPARED IN THE SOLID STATE In the solid state process, in embodiments, an appropriate ionic redox reagent is again stoichiometrically complexed to or loaded onto the ionomeric or ionophoric block copolymer to facilitate subsequent polymerization of the reactive monomer. The solid state preparative process, in embodiments, comprises: a.) mixing an ordered or structured solution containing ionomeric or ionophoric block or graft copolymers in a suitable solvent with a redox reagent to form a complexed structured solution of an ionophoric or ionomeric block or graft copolymer bound or complexed with the reagent; b.) coating, casting or spraying the micellar solution onto a suitable supporting substrate to form a film; c.) optionally and preferably drying the film; and d.) exposing the film to a solution or vapor containing the polymerizable aromatic or heteroarmatic monomer precursor selected from the group consisting of pyrrole, indole, thiophene, thianaphthene, indene, azulene, and ring substituent derivatives thereof, to form electrically conductive films. In this procedure, in embodiments, the residual ionic species arising from the reduced redox salt can optionally be removed by extracting the composite film with a suitable solvent.

Alternatively, powdered samples can be prepared in solid state processes by: a.) mixing an ionomeric or ionophoric block or graft copolymer, with a redox reagent to form a complexed structured micellar/vesicular solution which is an ionophoric or ionomeric block or graft copolymer bound or complexed to the redox agent by ionic, ion dipole, H-bonding or apolar bonding forces, depending on the nature of the block or graft copolymer and the nature of the redox agent; b.) precipitating the complexed and structured micellar/vesicular solution in a non solvent for the A segment of the block copolymer; c.) exposing at ambient temperature, the precipitate to the vapor or a solution of a polymerizable aromatic or heteroaromatic monomer selected from the group of pyrrole, indole, thiophene, thianaphthene, indene, azulene, and the aforementioned derivatives thereof; d.) optionally heating and cooling for a time, from several minutes to several hours, as appropriate to effect and control the polymerization of the aromatic or heteroaromatic monomer precursor thereby forming an electrically conductive or semiconductive composite comprised of the ionophoric or ionomeric polymer and partially oxidized aromatic or heteroaromatic polymer; and e.) optionally ion exchanging and extracting the composite to specify the counterion at the radical cation sites in the fractionally oxidized aromatic or heteroaromatic polymer and to remove residual ionic species arising from the reduced redox agent, respectively.

Preferred redox active metal cations are $Fe^{3+}$, $Cu^{2+}$, $Sn^{4+}$, and $Ce^{4+}$. Preferred counterions are chloride, alkylphosphates, tosylate, triflate, camphor sulfonates, naphthalene sulfonates, alkyl and aryl sulfonates with from about 6 to 20 carbon atoms, and the like.

Preferred redox active anions are peroxydisulfate, ferricyanide and iodate, $I_2/I_3^-$. Alkali and alkaline earth salts of these anions are preferred when they are sufficiently soluble in the solvent system. Alkylammonium cations can be employed in embodiments to enhance solubility of the redox anion.

Preferred ionomeric polymers are poly(styrene)-block-poly (acrylic acid), poly(butadiene)-block-poly(acrylic acid), poly (styrene)-block-poly(vinyl sulfonates), poly (ethylene)-block-poly(styrene sulfonate), poly(styrene)-block-poly(vinylpyridinium), and the like.

Preferred ionophoric polymers are poly (styrene)-block-poly(ethylene oxide) and poly(butadiene)-block-poly (ethylene oxide).

The conductivity values of the molded articles and films obtained by the solution and solid state processes of the present invention range from about $10^{-12}$ to $10^2$ Siemens per cm as measured by known and conventional means as described below.

Conductivity control of the composite compositions of the present invention can be achieved by varying the relative amounts of the ionomeric or ionophoric polymer complex and the amount of conducting aromatic or heteroaromatic polymer incorporated therein to form the morphological structures with the desired conductivity properties. The relative volume fraction of the ionophoric or ionomeric segment of the block copolymer will tend to determine the morphology of the dispersed phase, particularly for systems in which the conductive or semiconductive composite is formed by exposure of the solid state block copolymer complexed with redox reagent to the aromatic or heteroaromatic monomer. Composites in which the morphology is lamellar or bicontinuous generally exhibit higher relative levels of conductivity. Thus, composites with volume fractions of ion binding polymer and high loading levels of the conductive polymer which possess these geometries have the highest conductivities.

Conductivity values measured will vary depending on the method employed to measure conductivity and the intimacy of the contacting electrodes. The greatest precision is generally achieved by evaporation of gold electrodes onto films, pressed discs or molded articles and evaluating conductivity by the standard two probe for four probe techniques in surface and capacitive geometries. The conductivity values of articles and films obtained by the solution and solid state processes of the present invention, and outlined in Scheme I, range from about $10^{-12}$ to $10^{-1}$ Siemens per cm as measured by known and conventional means as described above.

SYNTHESIS AND SOURCING OF IONOPHORIC AND IONOMERIC BLOCK COPOLYMERS Two general methods are employed for the synthesis of block copolymers: (i) sequential or addition polymerization by the successive monomer addition leading to chain elongation by different monomers wherein the mechanism involved in each step of the polymerization may be radical, cationic or anionic; and (ii) the end-to-end coupling or linkage of different preformed polymers. Ionic block copolymers can be prepared by methods (i) and (ii) and by the chemical modification of a preformed neutral block copolymer. Living anionic polymerization processes were used to synthesize the block copolymers of the working Examples III through XI. However, most ionic or ionizable monomers cannot be directly polymerized by anionic techniques. To circumvent this problem the ionomeric polymer may be made from a masked or protected monomer with the masking or protecting group being removed after polymerization. Examples of masked monomers that generate carboxylic acid groups include: trimethylsilyl methacrylate, trimethyl silyl acrylate, t-butylacrylate, 1-butoxyethylacrylate, 1-ethoxyethyl acrylate, 2-tetrahydropyranyl acrylate, 2-tetrahydropyranyl methacrylate, and the like.

In addition, ionomeric block copolymers may be prepared with free radical initiators. This can be accomplished either by the preparation of the first segment of the polymer and the functionalization of that segment with an end group which is active as a free-radical initiator, or by use of bifunctional, sequential free-radical initiators. A number of processes for the preparation of block copolymers have been disclosed in the literature which proceed by the intermediacy of polymer chains end-functionalized as a free-radical initiator. These processes are discussed in the following references: C. W. Brown and G. A. Taylor, *J. Appl. Polymer Sci.*, 13, 629 (1969); A. Ladousse, C. Filliatre, B. Maillard, C. Manigand and J. J. Villenave, *European Polymer Journal*, 15, 987 (1979); B. M. Baysal, W. T. Short and A. V. Tobolsky, *J. Polym. Sci.*, A-1, 10, 898 (1972); and J. V. Crivello, D. A. Conlon and J. L. Lee, *J. Polym. Sci.:PtA*, 24, 1197 and 1251 (1986).

Group transfer polymerization processes can also be employed to prepare acrylic block copolymers with functional ionmeric and ionophoric segments, see for example, Owen W. Webster, U.S. Pat. No. 4,508,880, the disclosure of which is incorporated by reference herein in its entirety.

Ionophoric block polymers that can be employed in the present invention are illustrated in U.S. Pat. No. 4,592,989, the disclosure of which is incorporated by reference herein in its entirety. Ionophoric block copolymers of styrene and ethylene oxide are extensively used in the examples. These were synthesized by sequential anionic polymerization processes in a manner analogous to that described by O'Malley, et al., in *Block Polymers*, Plenus Press (1970).

Table I presents the mole ratio composition and molecular weight values for various PS-b-POE diblock copolymers prepared anionically of in accordance with the aforementioned synthetic processes and which can be selected in embodiments for use in the present invention.

Ionomeric block copolymers which may be employed in the present invention include: poly(styrene)-block-poly (acrylic acid), poly(butadiene)-block-poly(acrylic acid), poly(dimethylsiloxane)-block-poly(acrylic acid), poly (ethylene)-block-poly(styrene sulfonate), poly (methylmethacrylate)-block-poly(2-acrylamido-2-methylpropane sulfonate), poly(methylmethacrylate)-block-poly(acrylic acid), poly(styrene)-block-quaternized poly (vinyl pyridine), poly(methylmethacrylate)-block-poly(2-(dimethylamino)ethylmethacrylate), and the like. Such block copolymers can generally be prepared by sequential free-radical polymerization, anionic polymerization of monomers with masked functionality, group transfer polymerization or derivatization/functionalization of a segment in an initially nonionic block copolymer. In embodiments of the present invention, sequential anionic polymerization processes and sequential free

TABLE I

| Example | PS-b-POF+ mole ratio | PS Segment* $M_w \times 10^{-3}$ | Polydispersity | weight percent POE |
|---|---|---|---|---|
| | 59.3/40.7 | 87 | 1.33 | 22.4 |
| | 79.3/21.7 | 70.9 | 1.3 | 10.4 |
| III and VII | 70/30 | 50.7 | 1.65 | 15.3 |
| IV, VI, and VIII | 3.37/66.3 | 58 | 1.3 | 45.3 |
| | 57/43 | 58 | 1.3 | 24.2 |
| | 89/11 | 58 | 1.3 | 5 |
| | 66.7/33.3 | 53.2 | 1.3 | 17.4 |
| | 74.3/25.7 | 53.2 | 1.3 | 12.7 |
| | 85.1/14.9 | 53.2 | 1.3 | 6.9 |
| XI and XII | 13.7/86.3 | 66.8 | 1.3 | 72.6 |

*Polystyrene(PS) number average molecular weight determined by Gel Permeation Chromatography
+PS-b-POE where POE is polyoxyelthylene and b designates a block copolymer radical polymerization processes were used to prepare ionomeric block copolymers. Illustrative procedures for these two processes are given in Examples I and II.

In embodiments of the present invention, useful conductive and semi-conductive structured solutions, films and articles are prepared with compositions comprised of an aromatic or heteroaromatic polymer comprised of monomer or monomers selected from the group consisting of pyrrole, indole, thiophene, thianaphthene, indene, azulene and ring pendant substitutent derivatives thereof; and a block or graft copolymer selected from the group consisting of ionophoric and ionomeric copolymers wherein the block or graft copolymer has at least one apolar segment and at least one ion binding segment.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated.

For composite films cast from solution and composite films formed in the solid state by exposure of films of $Fe^{3+}$ complexed block copolymer films to vapor or solutions of aromatic monomer, it is experimentally convenient to screen for gross levels of conductivity by measuring, with a simple volt/ohm meter, the resistance of films cast on NESA glass substrates across an insulating gap of about 5 mm. For powders precipated from the composite solutions and powdered samples of conducting composites formed in the solid state, it is experimentally convenient to screen for gross levels of conductivity by measuring resistance in a capacitive geometry by contacting compacted disk samples of about 2 mm in thickness with the probes of a simple volt/ohm meter. The resistance measurements are reported in ohms or multiples thereof.

EXAMPLE I

Preparation of an Ionomeric Block Copolymer, Poly(styrene)-block-poly(acrylic Acid)

The above block copolymer was obtained by hydrolysis of poly(styrene)-block-(tertiary-butyl acrylate) which was prepared by the known sequential, living anionic polymerization of styrene and t-butyl acrylate.

Poly(styrene)-b-(t-butylacrylate)

Cyclohexane, 650 mL, was distilled from NaH (sodium hydride) into a 3 liter 4-necked round bottom flask equipped with two graduated addition funnels, a TEFLON® paddle stirrer and a port with a septum for syringe access. The entire apparatus was pressurized under argon and was free of oxygen and moisture. The cyclohexane introduced into the reactor was titrated to a faint orange color with oligomeric stryl lithium (styrene/sec-butyl Li) in order to remove trace impurities which could quench the living anion of the growing polymer chains. A stoichiometric amount, 1.876 mmol of initiator (sec-butyl lithium, 1.34 mL of a 1.4 molar solution of in cyclohexane) to achieve the desired degree of polymerization was then introduced into the reaction vessel via syringe. Styrene, 110 mL, was distilled from CaH and into one of the addition funnels. A portion, 15 mL, of this freshly distilled styrene monomer was added from the addition funnel, and the reaction vessel was held at ambient temperature for 20 minutes. After this period the remaining styrene monomer (95 mL) was added and held at ambient temperature for 5 minutes to complete the polymerization of the poly(styrene) segment to yield the highly orange colored living poly(stryl lithium). Tetrahydrofuran, freshly distilled from sodium benzophenone ketyl (10 mL), was added and the orange color of the living anion deepened to red. The reaction vessel was held at ambient temperature for an additional 20 minutes, at which time the living poly(stryl lithium) chains were capped with diphenyl ethylene by the addition of 2.0976 mmol of that monomer. A 1 mL sample of this diphenylethylene end-capped polymer was removed and its molecular weight was determined (by GPC) to be 84,600 with a polydispersity of about 1.28. A solution of lithium chloride in dry tetrahydrofuran (0.046 g/mL, 10 mL) and 640 mL of tetrahydrofuran distilled from sodium benzophenone ketyl was then added to the reactor and the temperature of the reactor was reduced to −80° C. Tertiary-butyl acrylate (50 mL) was added and the dark red color of the living stryl anion rapidly faded. The viscosity of the reaction mixture began to increase and after a period of 40 minutes at −80° C. the reaction was quenched with 5 mL of methanol to yield the diblock polymer of styrene and t-butyl acrylate. The block copolymer was recovered by diluting 50% by volume with methanol and subsequently precipitating this mixture by adding an equivalent volume of water. After settling, the polymer was isolated by filtration, washed in methanol, filtered and dried to yield 143 grams of poly(styrene)-b-(t-butylacrylate).

Poly(styrene)-b-(acrylic acid) was obtained by hydrolysis of poly(styrene)-b-(t-butyl acrylate). The hydrolysis was accomplished, by dissolving 120 grams of the above prepared t-butyl acrylate block copolymer in toluene (1,100 mL) and heating to reflux under an argon purge and in the presence of p-toluene sulfonic acid (6 grams of p-toluene sulfonate monohydrate). A Dean-Stark trap was employed to remove water and drive the elimination of isobutylene. The mixture was refluxed for 6 hrs to effect the hydrolysis. The resulting product was isolated by precipitation in methanol. NMR analysis showed the final product to be poly(styrene)-b-(acrylic acid co-methylacrylate) (72-b-22/6) molar. This product apparently results from the methanolysis of a small fraction of glutaric anhydride residues which form spontaneously in the poly(acrylic acid) segment of the block.

EXAMPLE II

Preparation of an Ionomeric Block Copolymer, Poly(styrene)-block-copoly(butylacrylate/acrylic Acid)

This ionomeric block copolymer was prepared by sequential free-radical polymerization initiating the polymerization with a difunctional free-radical initiator 4-(t-butylperoxycarbonyl)-3-hexyl-6-[7-(t-butylperoxycarbonyl) heptyl] cyclohexene (LUPERSOL RS 606). In a typical procedure 522 grams of styrene was dissolved in 1400 mL of toluene along with 1 mole percent LUPERSOL RS 606, based on the styrene component. The mixture was purged with argon and then polymerized under an argon atmosphere at 80° C. for 16 hours. The resulting product is a mixture of "dead" poly(styrene) chains and poly(styrene) chains bearing active hydroperoxide end-groups. A portion (about 100 mL) of the first stage reaction was isolated by precipitation in methanol, to remove unpolymerized monomer. The methanol content of the precipitate was reduced to a minimum by filtration and partial drying and the wet filter cake, 28 grams, (an amount containing 12.5 grams of functional, hydroperoxide-terminated, poly(styrene)), was dissolved in amyl acetate, 120 mL. Butyl acrylate (5.4 grams) and acrylic acid (5.4 grams) were added to the flask and the solution was purged with argon. The polymerization of the second segment of the block copolymer was initiated by raising the temperature of the reaction vessel to about 105 to 110° C. for 16 hours. The resulting product was a mixture of homopoly (styrene), copoly(butylacrylate/acrylic acid) and about 18 g of poly(styrene)-block-(copoly(butylacrylate/acrylic acid)). While the mixture can be complexed with a redox agent and used directly as a medium for the generation of ICP, isolation of the block copolymer fraction of the mixture is preferred when preparing conducting composites. The block copolymer was isolated from the mixture by: 1) precipitation into hexane (ten fold excess by volume of hexane); 2) extraction of the hexane precipitate with cyclohexane, a ten fold excess by volume of cyclohexane with two extractions which step removes homopoly(styrene); and 3) extraction of the residual material with methanol, a ten fold excess by volume of methanol with two extractions which process removes copoly(butylacrylate/acrylic acid). The resulting isolated product, is comprised of polystyrene, butylacrylate, and acrylic acid residues in a ratio of 70/16/14 by weight, respectively.

SYNTHESIS OF CONDUCTIVE/SEMICONDUCTIVE BLOCK COPOLYMER COMPOSITES

Table II provides a summary of the compositions described in Examples III through XII.

EXAMPLE III

Solution Synthesis of [PS-b-POE(70-b-30)molar/Poly(thiophene)][1.0/0.078]molar

Three grams of PS-b-POE, (70/30 molar ratio), was dissolved in 72 grams of toluene, warming the solution to melt any crystalline POE segments. This solution contained 0.010 moles of POE residues. In another vessel anhydrous $FeCl_3$ was dissolved in freshly distilled, dry nitromethane to yield a 27 weight percent solution. 1.2 grams of this solution was added to the toluene solution of PS-b-POE to form a complexed, structured or micellar solution. The mole ratio of POE to $Fe^{3+}$ in the resulting micellar solution is nominally 5:1 (oxyethylene:$Fe^{3+}$). 2,2'-bithiophene, 0.13 grams, was then added to the complexed micellar toluene solution of PS-b-POE•$FeCl_3$ and the mixture was agitated gently for 16 hours. The resultant product was a vesicular solution of a [PS-b-POE/poly(thiophene)] composite. Films cast on NESA glass substrates from this material were resistive, exhibiting a resistance across a 5 millimeter gap of greater than 20 megaohms. The composition of the composite, given quantitative polymerization of pyrrole, would be [PS-b-POE$_{(70-b-30)_M}$/Poly(thiophene)]$_{[1.0/0.78]_M}$. Electron microscopy revealed collapsed, $Fe^{2+}$stained vesicular structures, 20–60 nanometers in diameter, and comprised of PS-b-POE and poly(thiophene). These vesicular structures were identical in character to those observed in the toluene solution of PS-b-POE•$FeCl_3$. Extraneous $Fe^{2+}$ ions were optionally removed by precipitation in hexane and extraction with acetonitrile to yield a composite which contains about 4.15% by weight of poly(thiophene). The precipitated and extracted products may be redissolved or reconstituted in toluene or other appropriate solvents for solution casting of films or may be directly melt processed.

EXAMPLE IV

Solution Synthesis of [PS-b-POE(34-b-66) molar/Poly(thiophene)][1.0/0.088] molar The procedure of Example III was repeated with a block copolymer containing a larger POE segment (PS:POE= 34:66 molar). The amounts of $FeCl_3$ and bithiophene used were adjusted to preserve the reaction stoichiometry. Quantitative conversion of bithiophene monomer to poly (thiophene) and extraction of extraneous $Fe^{2+}$ ions would yield a product with a composition of [PS-b-POE$_{(34-b-66)_M}$/poly(thiophene)]$_{[1.0/0.088]_M}$ and containing about 11.24% by weight of poly(thiophene). Electron microscopic analysis showed micellar/vesicular structures similar those observed in Example III and ranging in size from 20 to 200 nanometers. This material was resistive, with films cast on NESA glass substrates exhibiting a resistance across a 5 millimeter gap of greater than 20 megaohms.

EXAMPLE V

Synthesis of [PS-b-PAA/Poly(thiophene)] 3.27 grams of PS-b-PAA/PMA (polymethacrylate), (72/22/6 molar ratio), was dissolved in 72 grams of toluene, by warming the solution and adding methanol in minor amounts as necessary to dissociate H-bonded carboxylic acid units. This solution contained 7.4 mmol of PAA (polyacrylic acid) residues. In another vessel anhydrous $FeCl_3$ was dissolved in freshly distilled, dry nitromethane to yield a 10 percent by weight solution. 5.3 grams of this solution was added to the toluene solution of PS-b-PAA/PMA. The mole ratio of PAA to $Fe^{3+}$ in the resulting micellar solution is nominally 2.25:1 (acrylic acid:$Fe^{3+}$). This ratio can be increased to 1:1 molar, PAA/$Fe^{3+}$ if desired. Bithiophene, 0.206 grams, was then added to the complexed micellar toluene solution of PS-b-PAA/PMA•$FeCl_3$ and the mixture was agitated gently for 16 hours. The resultant solution lightened in color becoming yellow, but the blue-black color normally expected for the poly(thiophene) composite was not observed. When this solution was puddle cast onto a glass slide at ambient temperature, a blue-black conductive film resulted. This material was conductive, with films cast on NESA glass substrates exhibiting a resistance across a 5 millimeter gap of about 300 kiloOhms. The composition of the product (film), after extraction with acetonitrile was [PS-b-PAA/PMA$_{(72-b-22/6)_M}$/PolY(thiophene)]$_{[1.0/0.167]_M}$ and contains 5.9% by weight of poly(thiophene).

EXAMPLE VI

Solid State Synthesis of [PS-b-POE(34-b-66) molar/Poly(thiophene)] [1.0/0.088] molar Three grams of PS-b-POE(34/66 molar), was dissolved in 72 grams of toluene with gentle warming, ≦65° C., of the solution to melt any crystalline POE segments. This solution contained 0.031 moles of POE residues. In another vessel anhydrous $FeCl_3$ was dissolved in freshly distilled, dry nitromethane to yield a 27 weight percent solution. 3.57 grams of this solution was added to the toluene solution of PS-b-POE. The mole ratio of POE to $Fe^{3+}$ in the resulting micellar solution was nominally 5:1 (oxyethylene:$Fe^{3+}$). The structured solution of PS-b-POE(34/66 molar)•$FeCl_3$ was precipitated in hexane to yield either a hexane swollen solid or dried to give a solvent free powder. Exposure of the hexane-swollen solid or the dry powder to a solution of 2,2'-bithiophene in cyclohexane resulted in the formation of poly(thiophene) within the POE•$Fe^{3+}$ domains. Disks about 2 millimeters in thickness pressed from this powdered sample material had a measured resistance of about 140 kiloOhms. Quantitative conversion of bithiophene to poly(thiophene) would yield a product with a composition of [PS-b-$POE_{(34-b-66)_M}$/Poly(thiophene)]$_{[1.0/0.10]_M}$ and containing 14.5% by weight of poly(thiophene).

EXAMPLE VII

Solution Synthesis of [PS-b-POE/Poly(pyrrole)] Three grams of PS-b-POE (70/30 molar ratio), was dissolved in 72 grams of toluene with gentle warming, ≦65° C., of the solution to melt any crystalline POE segments. This solution contained 0.010 moles of POE residues. In another vessel, anhydrous $FeCl_3$ was dissolved in freshly distilled, dry nitromethane to yield a 27 weight percent solution. 1.2 grams of this solution was added to the toluene solution of PS-b-POE. The mole ratio of POE to $Fe^{3+}$ in the resulting micellar solution was nominally 5:1 (oxyethylene:$Fe^{3+}$). Pyrrole, 0.06 grams, was then added to the micellar toluene solution of PS-b-POE•$FeCl_3$ and the mixture was agitated gently for 16 hours. The resultant product is a vesicular solution of a [PS-b-POE/poly(pyrrole)] composite. This material was resistive, with films cast on NESA glass substrates exhibiting a resistance across a 5 millimeter gap of greater than 20 megaOhms. Electron microscopy of isolated particles from the structured composite solution revealed collapsed $Fe^{2+}$ stained vesicular structures, 20–60 nanometers in diameter and comprised of POE and poly(pyrrole). These vesicular structures are identical in character to those observed in the precursing toluene solution of PS-b-POE•$FeCl_3$. Extraneous $Fe^{2+}$ ions may be optionally removed by precipitating the composite solution in methanol to yield semiconductive composites of the composition [PS-b-$POE_{(70-b-30)_M}$/Poly(pyrrole)]$_{[1.0/0.093]_M}$ and containing 1.96% by weight of poly(pyrrole). The precipitated material may then be redissolved in toluene or other appropriate solvents for solution casting of films or directly melt processed to yield semiconductive composites.

EXAMPLE VIII

Solid State Synthesis of [PS-b-POE(34-b-66)molar/ Poly(pyrrole)][1.0/0.088] molar Three grams of PS-b-POE(34/66 molar), was dissolved in 72 grams of toluene with gentle warming, ≦65° C., of the solution to melt any crystalline POE segments. This solution contained 0.031 moles of POE residues. In another vessel anhydrous $FeCl_3$ was dissolved in freshly distilled, dry nitromethane to yield a 27 weight percent solution. 3.57 grams of this solution was added to the toluene solution of PS-b-POE. The mole ratio of POE to $Fe^{3+}$ in the resulting micellar solution was nominally 5:1 (oxyethylene:$Fe^{3+}$). The structured solution of PS-b-POE(34/66 molar)•$FeCl_3$ was cast on a glass substrate to yield a solvent free film. Exposure of the cast film of PS-b-POE(34/66 molar)•$FeCl_3$ to the vapor of pyrrole resulted in the rapid formation of poly(pyrrole) within the POE•$Fe^{3+}$ domains. This material was conductive, with the composite films formed insitu on NESA glass substrates exhibiting a resistance across a 5 millimeter gap of 3,400 Ohms. Quantitative conversion of pyrrole to poly(pyrrole) would yield a product with a composition of [PS-b-$POE_{(34-b-66)_M}$/Poly(pyrrole)]$_{[1.0/0.10]_M}$ and containing 6.5% by weight of poly(pyrrole). Alternatively, the structured solution of PS-b-POE(34/66 molar)•$FeCl_3$ may be precipitated in hexane to yield a hexane swollen solid or dried to give a solvent free powder. Exposure of the hexane-swollen solid or the dry powder to the vapor of pyrrole monomer results in the rapid formation of poly(pyrrole) within the POE•$Fe^{3+}$ domains.

EXAMPLE IX

Solution Synthesis of [PS-b-PAA/Poly(pyrrole)]

PS-b-PAA/PMA, (72/22/6) molar, 3.27 grams, was dissolved in 72 grams of toluene, warming the solution and adding methanol as necessary to dissociate H-bonded carboxylic acid units. This solution contains 7.4 mmols of PAA residues. In another vessel anhydrous $FeCl_3$ was dissolved in freshly distilled, dry nitromethane to yield a 10% by weight solution. 5.3 grams of this solution was added to the toluene solution of PS-b-PAA/PMA. The mole ratio of PAA to $Fe^{3+}$ in the resulting micellar solution was nominally 3/1 PAA/$Fe^{3+}$. This ratio can in other embodiments be increased to 1/1 molar, PAA/$Fe^{3+}$. Pyrrole, 0.98 grams, was then added to the micellar toluene solution of PS-b-PAA/PMA•$FeCl_3$ and the mixture was agitated gently for 16 hours. The resultant product was a micellar/vesicular solution with a solid state composition of [PS-b-$PAA/PMA_{(72-b-22/6)_M}$/Poly(pyrrole)][1.0/0.20]$_M$; containing 2.9% by weight of poly(pyrrole). This material was resistive, with films cast on NESA glass substrates exhibiting a resistance across a 5 millimeter gap of greater than 20 megaohms.

EXAMPLE X

Solid State synthesis of [PS-b-PAA/PMA/poly(pyrrole)]

A solution of 10 mmols of PS-b-PAA/PMA, (72/22/6 molar), and 3.3 mmols of $FeCl_3$ is prepared as in Example V. A film was puddle cast from this solution and air dried for about 16 hours. The film was then exposed to excess pyrrole vapor to yield a conductive composite of the composition [PS-b-$PAA/PMA_{(72-b-22/6)_M}$/Poly(pyrrole)]$_{[1.0/0.22]_M}$ and containing 3.25% by weight of poly(pyrrole). Composite films of this material formed insitu on NESA glass substrates exhibited a resistance across a 5 millimeter gap of 1,200 Ohms. Similar conducting films are obtained on immersion of the puddle cast film in a dilute solution of excess pyrrole in hexane.

EXAMPLE XI

Solution Synthesis of [PS-b-POE(14-b-86)molar/ Poly(pyrrole)][1.0/0.088] molar]

Three grams of PS-b-POE(14/86 molar ratio), was dissolved in 72 grams of toluene with gentle warming, ≦65° C., of the solution to melt any crystalline POE segments. This solution contained 0.050 moles of ethylene oxide residues in the POE segment of the block copolymer. In another vessel anhydrous $FeCl_3$ was dissolved in freshly distilled, dry nitromethane to yield a 27 weight percent solution. 6 grams of this solution was added to the toluene solution of PS-b-POE. The mole ratio of POE to $Fe^{3+}$ in the resulting micellar solution was nominally 5:1 (oxyethylene: $Fe^{3+}$). Pyrrole, 0.29 grams, was then added to the micellar toluene solution of PS-b-POE•$FeCl_3$ complex and the mixture was agitated gently for 16 hours. The resultant product was a vesicular solution of a [PS-b-POE/poly(pyrrole)] composite. This material was resistive, with films cast on NESA glass substrates exhibiting a resistance across a 5 millimeter gap of greater than 20 megaOhms. Extraneous $Fe^{2+}$ ions may be optionally removed by precipitating the complex in methanol to yield semiconductive composites of the composition $[PS\text{-}b\text{-}POE_{(14\text{-}b\text{-}86)_M}/Poly(pyrrole)]_{[1.0/0.088]_M}$ and containing 8.8% by weight of poly(pyrrole). The precipitated material may then be redissolved in toluene or other appropriate solvents for solution casting of films or directly melt processed to yield semiconductive composites.

EXAMPLE XII

Solid State Synthesis of [PS-b-POE(14-b-86)molar/Poly(pyrrole)][1.0/0.088] molar The procedure of Example VIII was repeated with minor variations as indicated. Thus, exposure of a cast film of PS-b-POE(14/86 molar)•$FeCl_3$ to the vapor of pyrrole results in the rapid formation of poly(pyrrole) within the POE•$Fe^{3+}$ domains. Quantitative conversion of pyrrole to poly(pyrrole) would yield a product with a composition of $[PS\text{-}b\text{-}POE_{(14\text{-}b\text{-}86)_M}/Poly(pyrrole)]_{[1.0/0.088]_M}$ and containing 8.8% by weight of poly(pyrrole). This material was conductive, with the composite films formed insitu on NESA glass substrates exhibiting a resistance across a 5 millimeter gap of 2,600 Ohms. Alternatively, the structured solution of PS-b-POE(14/86 molar)•$FeCl_3$ may be precipitated in hexane to yield a hexane swollen solid or dried to give a solvent free powder. Exposure of the hexane-swollen solid or the dry powder to the vapor of pyrrole monomer also resulted in the rapid formation of poly(pyrrole) within the POE•$Fe^{3+}$ domains.

EXAMPLE XIII

Structured solutions such as those prepared in Examples III, IV, V and XI are particularly useful for coating of films on plastic housings and components to provide antistatic properties and electromagnetic shielding for housings of electronic devices and components. Thus, the composite composition of Example XI is spray coated on the inside surface of a molded NORYL® computer housing to provide EMI shielding across a broad range of frequencies.

The disclosures of all the patents and publications mentioned herein are incorporated by reference in their entirety.

Other modifications of the present invention may occur to those skilled in the art subsequent to a review of the present application. The aforementioned modifications, including equivalents thereof, are intended to be included within the scope of the present invention.

TABLE II

| Ingredients/Example | PS-b-POE (70/30) molar[a] (moles) | PS-b-POE (34/66) molar[a] (moles) | PS-b-POE (14/86) molar[a] (moles) | PS-b-PAA/PMA (72-b-22/6) molar[b] (moles) | $FeCl_3$ (27% by wt in $CH_3NO_2$) (moles) | Bithiophene (moles) | Pyrrole (moles) |
|---|---|---|---|---|---|---|---|
| III | 3.0 g (1.0 × $10^{-2}$) | | | | 1.2 g (2.09 × $10^{-3}$) | 0.13 g (7.8 × $10^{-4}$) | |
| IV | | 3.0 g (3.1 × $10^{-2}$) | | | 3.57 g (6.19 × $10^{-3}$) | 0.38 g (2.3 × $10^{-3}$) | |
| V | | | | 3.27 g (7.5 × $10^{-3}$) | 5.3 g[c] (3.3 × $10^{-3}$) | 0.206 g (1.24 × $10^{-3}$) | |
| VI | | 3.0 g (1.0 × $10^{-2}$) | | | 3.57 g (6.19 × $10^{-3}$ moles) | Excess | |
| VII | 3.0 g (1.0 × $10^{-2}$) | | | | 1.2 g (2.09 × $10^{-3}$) | | 0.06 g (9.3 × $10^{-4}$) |
| VIII | | 3.0 g (1.0 × $10^{-2}$) | | | 3.57 g (6.19 × $10^{-3}$) | | Excess |
| IX | | | | 3.27 g (7.5 × $10^{-3}$) | 5.3 g[c] (3.3 × $10^{-3}$) | | 0.10 g (1.47 × $10^{-3}$) |
| X | | | | 3.27 g (7.5 × $10^{-3}$) | 5.3 g[c] (3.3 × $10^{-3}$) | | Excess |
| XI | | | 3.0 g (5.0 × $10^{-2}$) | | 6 g (1.0 × $10^{-2}$) | | 0.29 g (4.4 × $10^{-3}$) |
| XII | | | 3.0 g (5.0 × $10^{-2}$) | | 6 g (1.0 × $10^{-2}$) | | Excess |

[a]Dissolved in 72 g of toluene
[b]Dissolved in 72 g of toluene with about 1 ml of methanol added to effect micellar dissolution.
[c]$FeCl_3$, 10% by weight in $CH_3NO_2$

What is claimed is:

1. A composition comprised of a composite comprised of an aromatic or heteroaromatic polymer comprised of monomer or monomers selected from the group consisting of pyrrole, indole, thiophene, thianaphthene, indene, azulene and ring pendant substitutent derivatives thereof as a discrete phase; and a block copolymer as a continuous phase selected from the group consisting of ionophoric and ionomeric copolymers, wherein the block copolymer has at least one apolar segment and at least one ion binding segment, wherein the ionomeric or ionophoric block copolymer is present in an amount from about 99 to about 50 percent by weight based on the combined weight of the block copolymer and the aromatic or heteroaromatic polymer, wherein said block copolymer provides micellar or vesicular domains for organization and polymerization of said monomer or monomers.

2. A composition according to claim 1, which is soluble, melt processable, and electrically conductive.

3. A composition according to claim 1, wherein the number of monomers in the aromatic or heteroaromatic polymer is from about 10 to about $10^{10}$.

4. A composition according to claim 1, wherein the number of monomers in the aromatic or heteroaromatic polymer is from about $10^2$ to about $10^6$.

5. A composition according to claim 1, wherein the aromatic or heteroaromatic polymer is crosslinked or networked with a degree of polymerization of from about 10 to about $10^{10}$.

6. A composition according to claim 1, wherein the composition is a vesicular solution contained in a solvent for at least one apolar segment of the ionophoric or ionomeric block copolymer.

7. A composition according to claim 1, wherein the ring pendant substitutents of said derivatives are selected from the group consisting of alkyl and alkoxy groups with from 1 to about 20 carbon atoms, aryl groups with from 6 to 24 carbon atoms, and carboxyl, cyano, nitro and halogen groups.

8. A composition according to claim 1, wherein the apolar segment of the ionophoric and ionomeric copolymer is poly styrene) and the composite is soluble in solvents which dissolve poly(styrene) hopoloymers.

9. A composition according to claim 1, wherein the apolar segment of the ionophoric and ionomeric copolymer is poly(butadiene) and the composite is soluble in solvents which dissolve poly(butadiene) homopolymers.

10. A composition according to claim 1, wherein the composition is melt processable in a temperature range from about 50° C. to about 250° C.

11. A composition according to claim 1, wherein the electrical conductivity thereof is from about $10^{-12}$ to about $10^2$ Siemens per cm.

12. A composition according to claim 1, wherein the ionomeric or ionophoric polymer is an A-B diblock copolymer wherein A and B are independently homopolymeric, copolymeric, or multi-meric.

13. A composition according to claim 1, wherein the ionomeric or ionophoric polymer is an A-B-A triblock polymer wherein A and B are independently homopolymeric, copolymeric, or multi-meric.

14. A composition according to claim 1, wherein the ionomeric or ionophoric polymer is an A-B-C triblock polymer wherein A, B, and C are independently homopolymeric, co-polymeric, or multi-meric.

15. A composition according to claim 1, wherein the ionomeric or ionophoric polymer is an A-B diblock copolymer wherein the A block is apolar, and the B block is ionophoric or ionomeric.

16. A composition according to claim 1, wherein the block copolymer is ionomeric and is selected from the group consisting of poly(styrene)-block-copoly(butylacrylate/acrylic acid), poly(styrene)-block-poly(acrylic acid), poly(butadiene)-block-poly(acrylic acid), poly(dimethylsiloxane)-block-poly(acrylic acid), poly(ethylene)-block-poly(acrylic acid), poly(ethylene)-block-poly(styrene sulfonate) poly(methylmethacrylate)-block-poly(acrylic acid), poly(methylmethacrylate)-block-poly(2-acrylamido-2-methyl propane sulfonate), poly(styrene)-block-poly(vinyl pyridinium) salt, poly(methylmethacrylate)-block-poly(ethylene oxide), and poly(methyl methacrylate)-block-poly(2-(dimethylamino) ethylmethacrylate).

17. A composition according to claim 1, wherein the block copolymer is ionophoric and is selected from the group consisting of poly(styrene-block-poly(ethylene oxide), poly(butadiene)-block-poly(ethylene oxide), poly(styrene)-block-poly(methylmethacrylate), poly(dimethylsiloxane)-block-poly(ethylene oxide), and poly(ethylene)-block-poly(ethylene oxide).

18. A composition according to claim 1, further comprising a homopolymer with a composition or structure corresponding to the ion binding B block of the block copolymer in an amount from 25 to 1 50 percent by weight of h he ion binding B block of the block copolymer.

* * * * *